(12) United States Patent
Bindl et al.

(10) Patent No.: US 11,231,072 B2
(45) Date of Patent: Jan. 25, 2022

(54) GEAR ASSEMBLY WITH THRUST WASHER CONFIGURATION

(71) Applicant: DEERE & COMPANY, Moline, IL (US)

(72) Inventors: Reginald M. Bindl, Bettendorf, IA (US); Prashant M. Jundale, Pune (IN); Javier Jose Perez, Madrid (ES)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/071,194

(22) Filed: Oct. 15, 2020

(65) Prior Publication Data

US 2021/0404514 A1 Dec. 30, 2021

(30) Foreign Application Priority Data

Jun. 30, 2020 (IN) .............................. 202021027750

(51) Int. Cl.
| | | |
|---|---|---|
| *F16C 17/04* | (2006.01) | |
| *F16C 33/10* | (2006.01) | |
| *F16H 57/04* | (2010.01) | |
| *F16H 57/021* | (2012.01) | |
| *F16H 57/08* | (2006.01) | |

(52) U.S. Cl.
CPC ....... *F16C 33/1065* (2013.01); *F16H 57/021* (2013.01); *F16H 57/0471* (2013.01); *F16C 2361/61* (2013.01); *F16H 2057/085* (2013.01)

(58) Field of Classification Search
CPC .. F16C 17/04; F16C 33/1065; F16C 2226/62; F16C 2361/61; F16H 57/021; F16H 57/0471; F16H 57/0479; F16H 2057/085
See application file for complete search history.

(56) References Cited

U.S. PATENT DOCUMENTS

| | | | | | |
|---|---|---|---|---|---|
| 2,523,847 | A | * | 9/1950 | Russey ................... | F16B 43/00 384/425 |
| 5,188,576 | A | * | 2/1993 | Maguire ............. | F16H 57/0479 475/348 |
| 5,302,160 | A | * | 4/1994 | Fujioka ................ | F16H 57/082 475/348 |
| 5,368,528 | A | * | 11/1994 | Farrell .................... | F16C 19/48 384/424 |
| 5,470,286 | A | * | 11/1995 | Fan ....................... | F16H 57/082 475/331 |

(Continued)

FOREIGN PATENT DOCUMENTS

| | | |
|---|---|---|
| DE | 102016200338 A1 | 7/2017 |
| DE | 202019105880 U1 | 1/2020 |

(Continued)

OTHER PUBLICATIONS

Image of 4300601M1 Thrust Washer from Maple Lane Farm Service Inc., Retrieved from the Internet: <URL: maplelanefarmservice.ca/shop/parts/agco/hardware-and-standard-parts/aco-4300601m1/> (Apr. 24, 2020).

(Continued)

*Primary Examiner* — Phillip A Johnson (57) ABSTRACT

A gear assembly comprises an axle defining an axis of rotation, a gear mounted to the axle for rotation relative to the axle about the axis of rotation, a pin, and a thrust washer disposed axially adjacent to the gear. The pin is disposed in a portion of the thrust washer and extends into the axle.

17 Claims, 8 Drawing Sheets

(56) References Cited

U.S. PATENT DOCUMENTS

| | | | |
|---|---|---|---|
| 5,593,362 A * | 1/1997 | Mizuta | F16H 57/082 |
| | | | 475/348 |
| 5,829,888 A * | 11/1998 | Bhargava | F16C 17/04 |
| | | | 384/420 |
| 6,702,711 B2 | 3/2004 | Zelikov et al. | |
| 8,894,537 B2 | 11/2014 | Norem et al. | |
| 10,571,013 B2 * | 2/2020 | Ishino | F16H 57/0486 |
| 2009/0190870 A1 * | 7/2009 | Chen | F16C 19/48 |
| | | | 384/420 |
| 2012/0171017 A1 * | 7/2012 | Norem | F02C 7/277 |
| | | | 415/122.1 |
| 2013/0217535 A1 * | 8/2013 | Suzuki | F16H 57/082 |
| | | | 475/331 |
| 2020/0088291 A1 | 3/2020 | Payne et al. | |

FOREIGN PATENT DOCUMENTS

| | | | |
|---|---|---|---|
| JP | S517543 U | 1/1976 | |
| JP | H0314947 A | 1/1991 | |
| JP | H10311410 A | 11/1998 | |
| WO | WO-0043688 A1 * | 7/2000 | F16C 17/04 |

OTHER PUBLICATIONS

Extended European Search Report and Written Opinion issued in European Patent Application No. 21178823.7, dated Nov. 5, 2021 (7 pages).

\* cited by examiner

GEAR ASSEMBLY WITH THRUST WASHER CONFIGURATION

FIELD OF THE DISCLOSURE

The present disclosure relates to a gear assembly, and, particularly, to a gear assembly a thrust washer.

BACKGROUND OF THE DISCLOSURE

Gear assemblies can have a number of gears to provide an output with a selected gear ratio. Among a variety of components, the gear assembly may have a number of thrust washers to bear thrust loading of one or more gears of the gear assembly. Such a gear assembly may be employed as a drive gear assembly for a chopper on an agricultural harvester, to name but one example.

SUMMARY OF THE DISCLOSURE

According to an aspect of the present disclosure, a gear assembly comprises a support, an axle mounted to the support and defining an axis of rotation, a gear mounted to the axle for rotation relative to the axle about the axis of rotation, a pin, and a thrust washer disposed axially adjacent to the gear and blocked against rotation relative to the support about the axis of rotation. The thrust washer comprises a through-hole and a channel. The axle is disposed in the through-hole. The pin is disposed in the channel and extends into the axle.

According to another aspect of the present disclosure, a gear assembly comprises an axle defining an axis of rotation, a gear mounted to the axle for rotation relative to the axle about the axis of rotation, a pin, and a thrust washer disposed axially adjacent to the gear. The thrust washer comprises a bight. The pin is disposed in the bight and extends into the axle.

The above and other features will become apparent from the following description and accompanying drawings.

BRIEF DESCRIPTION OF THE DRAWINGS

The detailed description of the drawings refers to the accompanying figures in which (generic hatching is applied in the drawings).

DETAILED DESCRIPTION OF THE DRAWINGS

Figure 1:
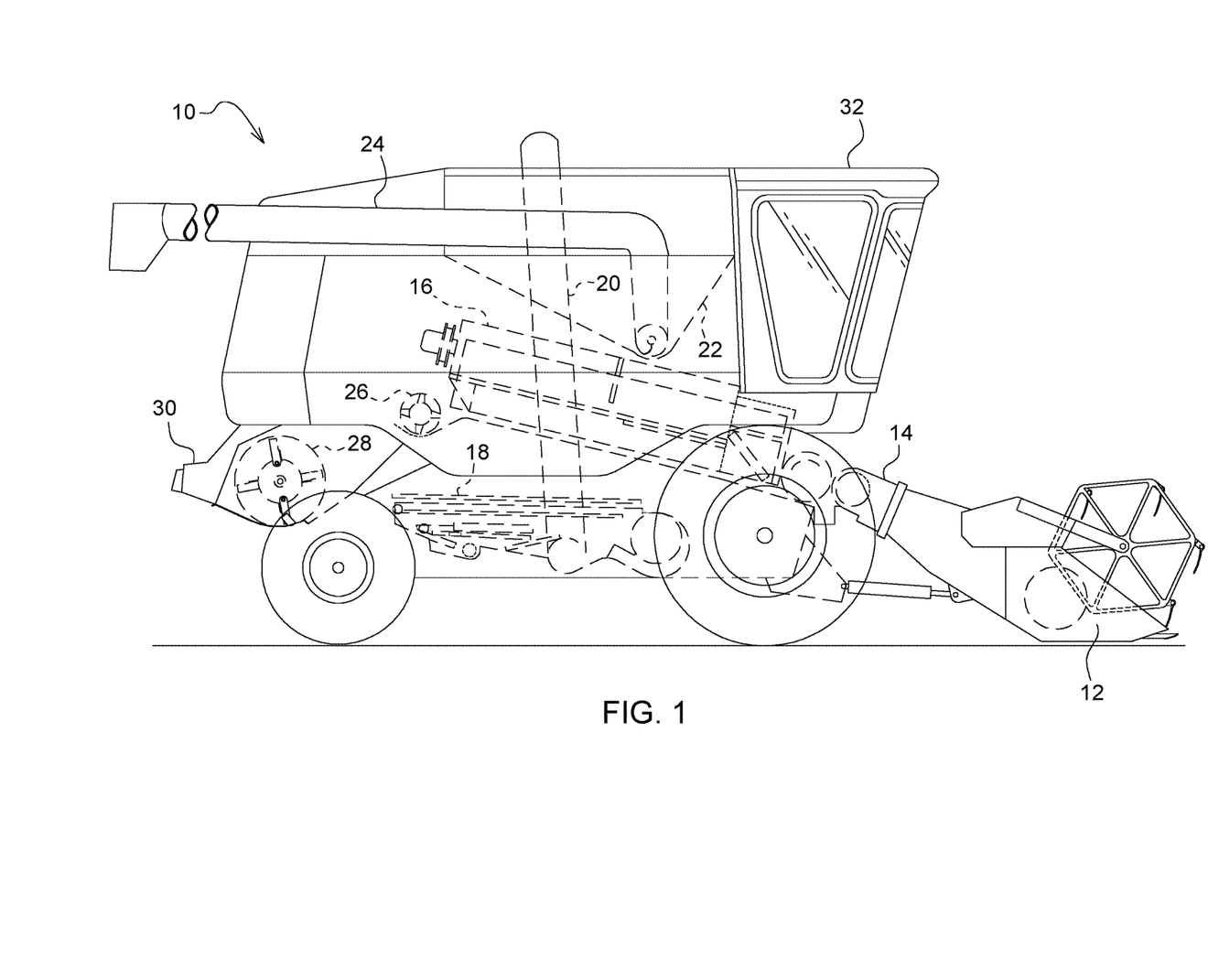
FIG. 1 is a side elevational view showing an agricultural harvester.

Referring to FIG. 1, an agricultural harvester 10 is configured harvest to crop from a field. The harvester 10 processes the crop, separating grain from crop residue. In general, the harvester 10 may include an implement 12 to cut, gather, and transport crop rearwardly, a feederhouse 14 to advance crop received from the implement 12 into the body of the harvester 10, a threshing and separating section 16 to thresh crop and further separate grain from crop residue, a cleaning section 18 including one more chaffers and sieves to separate grain from chaff or other relatively small pieces of crop material, a clean grain elevator 20 to elevate clean grain to a storage bin 22, an unloader 24 to unload clean grain to another location, a beater 26 to beat residue that is received from the threashing and separating section 16 and does not pass to the cleaning section, a chopper 28 (e.g., a flail chopper) to chop crop residue, and a residue spreader 30 to disperse crop residue onto the field. A person may control the harvester 10 from an operator's station 32 of the harvester 10. The harvester 10, including such portions thereof, may be configured in a wide variety of ways.

Figure 2:
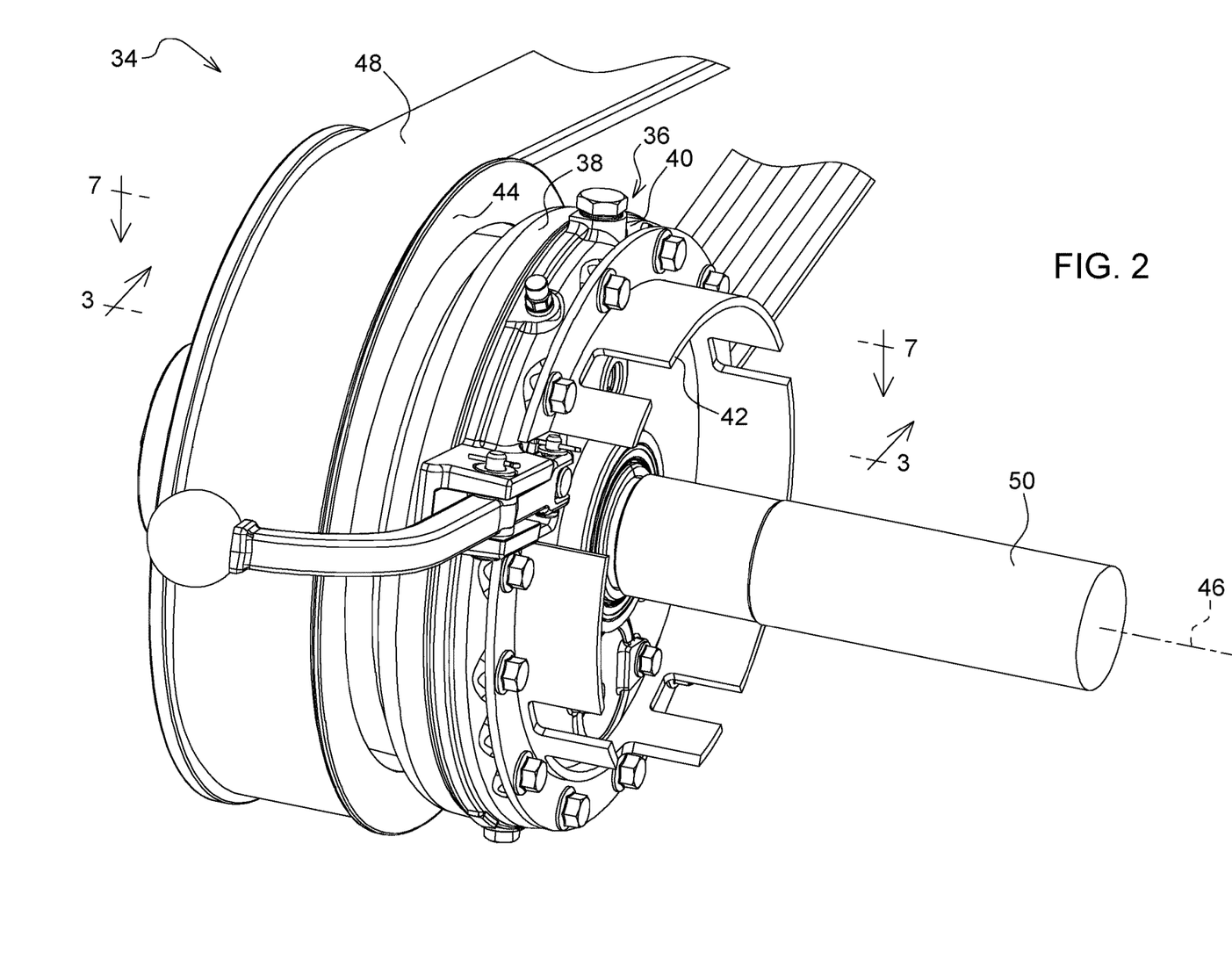
FIG. 2 is a perspective view showing a gear assembly to drive a chopper of the agricultural harvester.
Figure 3:
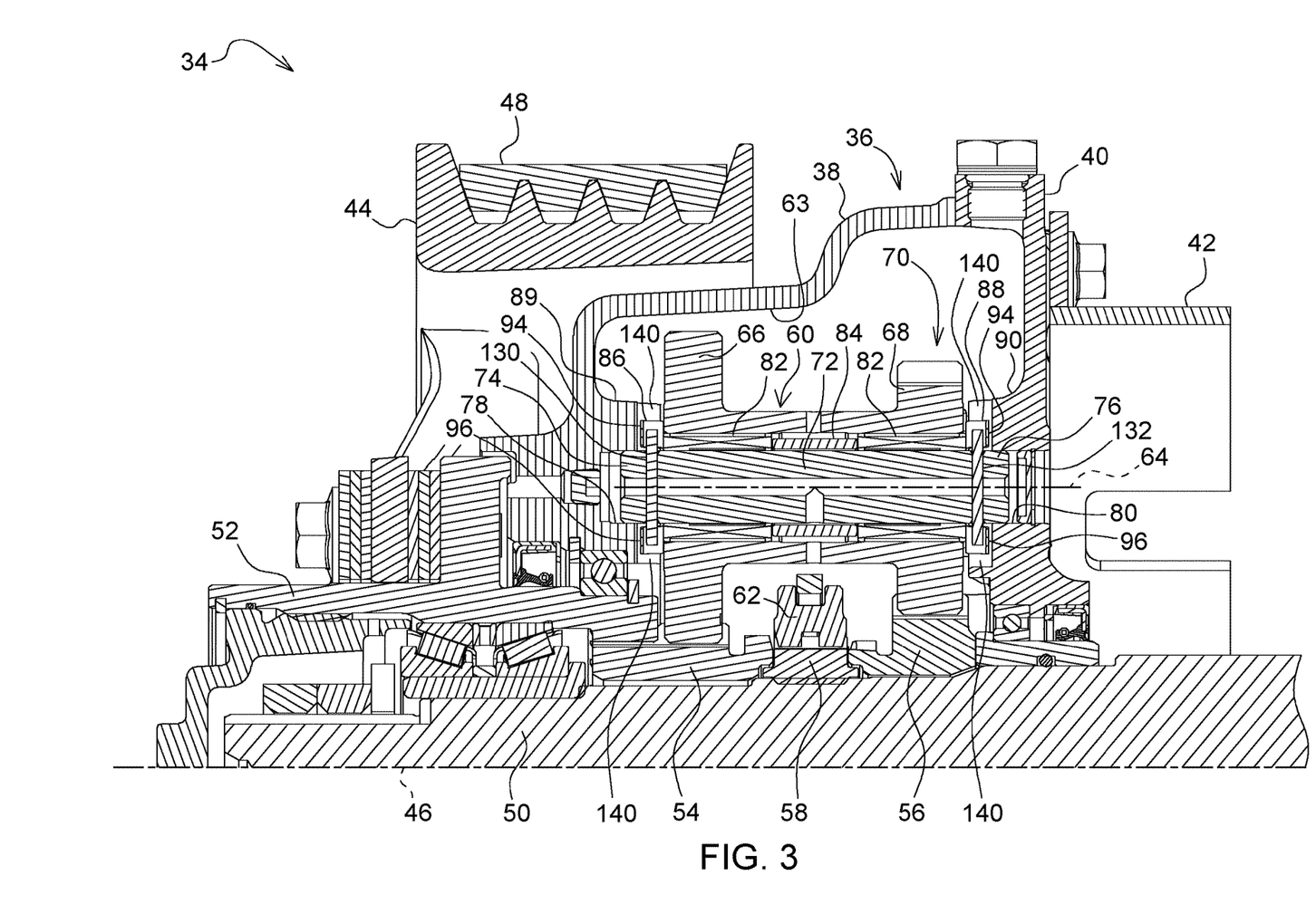
FIG. 3 is a sectional view, taken along lines 3-3 of FIG. 2, showing a planet gear assembly of the gear assembly.

Referring to FIGS. 2 and 3, the harvester 10 includes a gear assembly 34 configured to rotatably drive the chopper 28. It is to be understood that, although the gear assembly 34 is disclosed herein as part of the harvester 10 and in connection with the chopper 28, the gear assembly 34 may be used in a wide variety of contexts.

The gear assembly 34 includes a support 36. The support 36 is configured, for example, as a housing with a first housing portion 38 and a second housing portion 40 fastened to the first housing portion 38 (e.g., with bolts). The support 36 may be configured in a wide variety of ways, with a housing being but one embodiment.

The support 36 may be fixed against movement relative to a frame of the harvester 10. A torque reaction member 42 may be fastened to the support 36 (e.g., with bolts) to block rotation of the support 36.

The gear assembly 34 receives a rotary input and outputs a rotary output. The gear assembly 34 includes a pulley 44 to be driven in rotation about an axis of rotation 46 by a belt 48 imparting the rotary input to the pulley 44. The gear assembly 34 includes an output shaft 50 that defines and is rotatable about the axis of rotation 46 to provide the rotary output.

The gear assembly 34 includes an input sleeve 52. The input sleeve 52 is fixed to the pulley 44 for rotation therewith such that rotation of the pulley 44 causes rotation of the input sleeve 52. The input sleeve 52 surrounds the output shaft 50. A bearing (e.g., double-row tapered roller bearing) is disposed radially between the sleeve 52 and the output shaft 50 for relative rotation therebetween about the axis of rotation 46. A bearing (e.g., ball bearing) is disposed radially between the input sleeve 52 and the first housing portion 38 for rotation of the input sleeve 52 relative to the support 36. A bearing (e.g., ball bearing) is disposed radially between the second housing portion 40 and a support sleeve surrounding the output shaft 50 for rotation of the output shaft 50 about the axis of rotation 46.

The gear assembly 34 includes a first sun gear 54, a second sun gear 56, an output gear 58, a number of planet gears 60 (e.g., three) one of which is shown, and a shifter collar 62. The input sleeve 52 surrounds and is splined to the first sun gear 54 to transmit rotation of the input sleeve 52 to the first sun gear 54. The first and second sun gears 54, 56 surround and are rotatably mounted to the output shaft 50 so as to be rotatable relative thereto. The output gear 58 surrounds and is splined to the output shaft 50 such that rotation of the output gear 58 about the axis of rotation 46 causes corresponding rotation of the output shaft 50.

The planet gears 58 are spaced evenly about the axis of rotation 46 of the output shaft 50. Each planet gear 58 is positioned in an interior region 63 of the support 36 when the support 36 is configured as a housing. Each planet gear 58 has an axis of rotation 64 fixed relative to the support 36 and the axis of rotation 46 of the output shaft 50, and is configured, for example, as a compound gear having a first gear 66 and a second gear 68. The gears 66, 68 are fixed to another against movement relative thereto. The first sun gear 54 and the first gear 66 mesh with one another, and the second sun gear 56 and the second gear 68 mesh with one another.

The shifter collar 62 surrounds and is splined to the output gear 58 and is displaceable in axially opposite directions relative to the axis of rotation 46. A shifter lever 70 is coupled to the shifter collar 62 to displace the shifter collar 62 between a neutral position, a first active position, and a second active position. In the neutral position, the shifter collar 62 is splined to the output gear 58 but not either sun gear 54, 56. In the first active position, the shifter collar 62 is splined to the first sun gear 54 and the output gear 58 such that power flows from the input sleeve 52 to the first sun gear 54, the shifter collar 62, the output gear 58, and then the output shaft 50. In the second active position, the shifter collar 62 is splined to the second sun gear 56 and the output gear 58 such that power flows from the input sleeve 52 to the first sun gear 54, the first gear 66 of each planet gear 58, the second gear 68 of each planet gear 58, the second sun gear 56, the shifter collar 62, the output gear 58, and then the output shaft 50. The second active position provides the output shaft 50 with a reduced speed relative to the first active position.

Referring to FIGS. 3-7, each planet gear 60 is included in a planet gear assembly 70 of the gear assembly 34, one of which is shown. The planet gear assemblies 70 are similar to one another in structure and function.

Each planet gear assembly 70 includes an axle 72 and a planet gear 60. The axle 72 is mounted to the support 36 and defines the axis of rotation 64 for the planet gear 60. The axle 72 includes a first end portion 74 and a second end portion 76. The first end portion 74 is disposed in and supported by an axial first bore 78 included in the first housing portion 38 and co-axial with the axis of rotation 64, and the second end portion 76 is disposed in and supported by an axial second bore 80 included in the second housing portion 40 and co-axial with the axis of rotation 64.

The planet gear 60 is rotatably mounted to the axle 72 for rotation relative to the axle 72 about the axis of rotation 64. A pair of bearings 82 (e.g., needle roller bearings) is disposed radially between the planet gear 60 and the axle 72 for rotation of the planet gear 60 relative to the axle 72 about the axis of rotation 64. A spacer sleeve 84 is disposed axially between the bearings 82 to space the bearings 82 axially apart from one another relative to the axis of rotation 64.

The planet gear assembly 70 includes a first thrust washer 86 and a second thrust washer 88, which are similar to one another in structure and function. The thrust washers 86, 88 are configured to bear axial thrust loading by the planet gear 60.

The thrust washers 86, 88 are disposed axially adjacent to the planet gear 60 and the respective bearing 82 such that the planet gear 60 and the bearings 82 are disposed axially between the thrust washers 86, 88 relative to the axis of rotation 64. The first thrust washer 86 is disposed axially between a first boss 89 of the first housing portion 38 adjacent to a first axial side 114 of the first thrust washer 86 and the planet gear 60 and respective bearing 82 adjacent to a second axial side 116 of the first thrust washer 86 relative to the axis of rotation 64. The second thrust washer 88 is disposed axially between a second boss 90 of the second housing portion 40 adjacent to the first axial side 114 of the second thrust washer 88 and the planet gear 60 and respective bearing 82 adjacent to the second axial side 116 of the second thrust washer 88 relative to the axis of rotation 64.

Each thrust washer 86, 86 includes a through-hole 92 in which the axle 72 is disposed. The first end portion 74 of the axle 72 is disposed in the through-hole 92 of the first thrust washer 86 such that the first thrust washer 86 surrounds the first end portion 74 of the axle 72. The second end portion 76 of the axle 72 is disposed in the through-hole 92 of the second thrust washer 88 such that the second thrust washer 88 surrounds the second portion 76.

Referring to FIGS. 8A-8D, each thrust washer 86, 88 includes a first bight 94 and a second bight 96. The first and second bights 94, 96 are diametrically aligned with one another. The thrust washer 86, 88 is configured, for example, as a ring formed to include the first bight 94, the second bight 96, a first arcuate portion 98 connecting the first and second bights 94, 96, and a second arcuate portion 99 opposite to and co-planar with the first arcuate portion 98 and connecting the first and second bights 94, 96. During manufacturing, the thrust washer 86, 88 initially has an oval shape which is then stamped to include the bights 94, 96 and provide the thrust washer 86, 88 with a generally circular shape.

Each arcuate portion 98, 99 includes a first face 110 and a second face 112, which face in axially opposite directions. Each first face 110 is included in a first axial side 114 of the thrust washer 86, 88, and each second face 112 is included in a second axial side 116 of the thrust washer 86, 88.

Referring to FIGS. 3-7, the first faces 110 of the arcuate portions 98, 99 of the first thrust washer 86 contact a first boss 89 of the first housing portion 38, and the second faces 112 of the arcuate portions 98, 99 of the first thrust washer 86 contact the planet gear 60 and the respective bearing 82. The first faces 110 of the arcuate portions 98, 99 of the second thrust washer 88 contact a second boss 90 of the second housing portion 40, and the second faces 112 of the arcuate portions 98, 99 of the second thrust washer 88 contact the planet gear 60 and the respective bearing 82. The second faces 112 provide axial bearing surfaces for the planet gear 60 and bearings 82 relative to the axis of rotation 64, and prevent or otherwise limit axial movement of the planet gear 60 and bearings 82 relative to the axis of rotation 64.

The thrust washer 86, 88 is blocked against rotation relative to the support 36 about the axis of rotation 64. Each bight 94, 96 projects axially into the support 36. Each of the first and second housing portions 38, 40 includes a first groove 118 and a second groove 120. The first and second bights 94, 96 of the first thrust washer 86 project axially respectively into, so as to be disposed respectively in, the first and second grooves 118, 120 of the first housing portion 38. The first and second bights 94, 96 of the second thrust washer 88 project axially respectively into, so as to be disposed respectively in, the first and second grooves 118, 120 of the second housing portion 40. In this way, the grooves 118, 120 block rotation of the bights 94, 96, respectively, about the axis of rotation 64. The support 36 blocks rotation of the thrust washers 86, 88 about the axis of rotation 64.

The grooves 118, 120 are radial grooves in that they extend radially relative to the axis of rotation 64. The grooves 118, 120 of each thrust washer 86, 88 are diametrically aligned relative to the axis of rotation 64. The grooves 118, 120 of the first thrust washer 86 are included in the first boss 89 of the first housing portion 38, and the grooves 118, 120 of the second thrust washer 88 are included in the second boss 90 of the second housing portion 40. The first and second bosses 89, 90 are formed to include the first and second bores 78, 80, respectively.

Each thrust washer 86, 88 includes a first channel 122 and a second channel 124. With respect to each thrust washer 86, 88, the first bight 94 and the second bight 96 include respectively the first channel 122 and the second channel 124. The axial second side 116 of the thrust washer 86, 88 includes the first channel 122 and the second channel 124. Each channel 122, 124 extends from a radially outer periphery 126 of the thrust washer 86, 88 to a radially inner periphery 128 of the thrust washer 86, 88. The radially inner periphery 128 defines the through-hole 92 of the thrust washer 86, 88.

Figure 4:
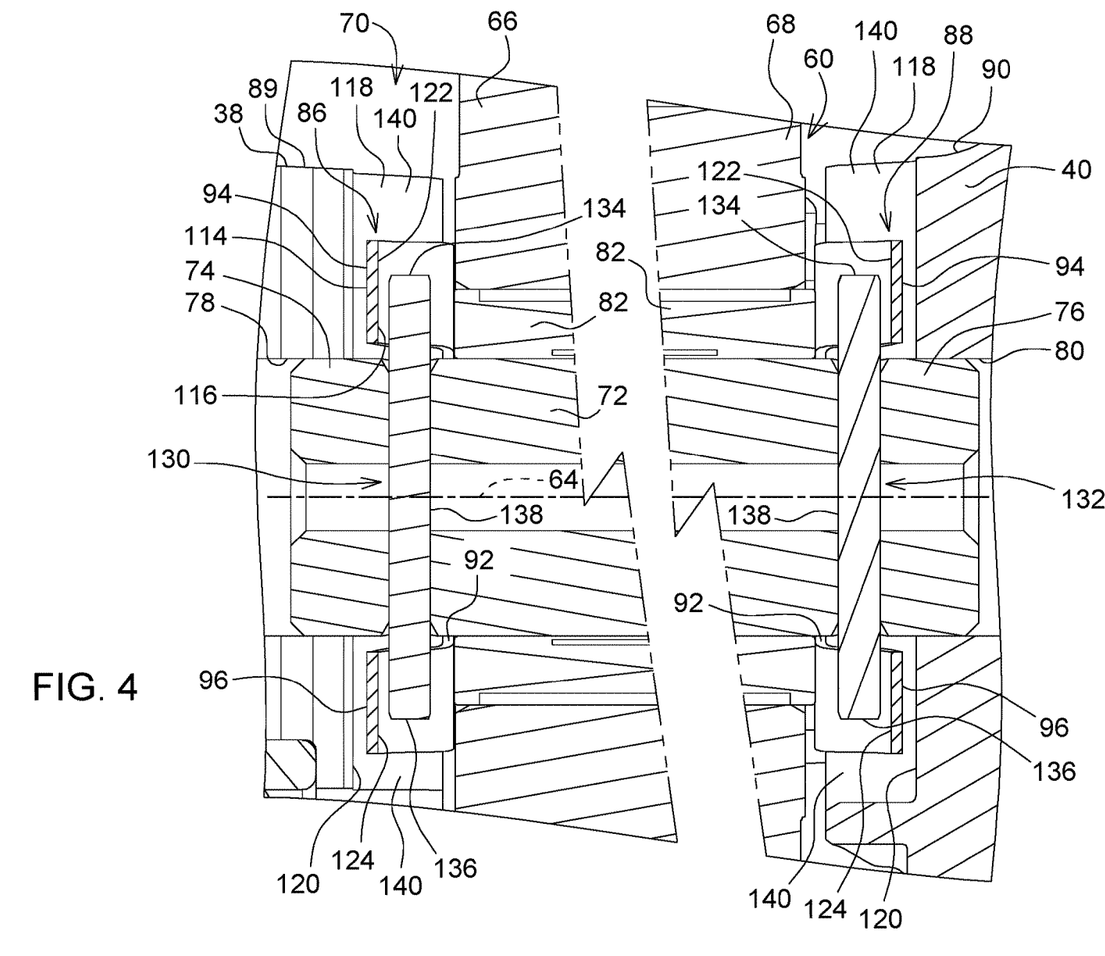
FIG. 4 is an enlarged sectional view of the planet gear assembly, with portions broken away, showing pins extending transversely through opposite end portions of an axle and disposed in bights of respective thrust washers.
Figure 5A:
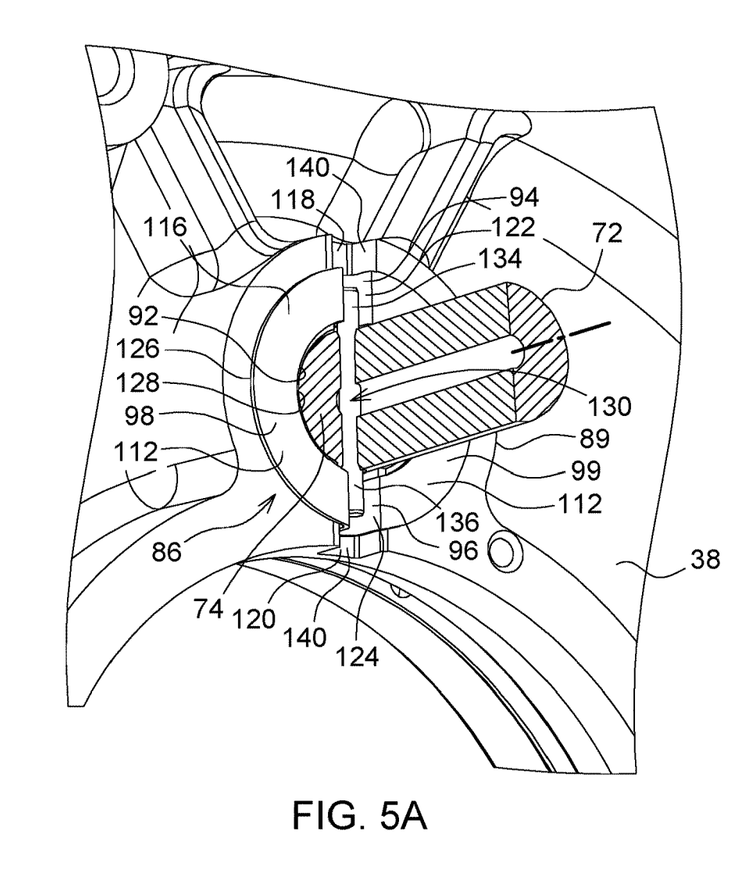
FIG. 5A is a perspective view, with portions broken away, showing a first of the pins extending through the axle and having opposite end portions disposed in respective bights of a first of the thrust washers received in respective grooves.
Figure 5B:
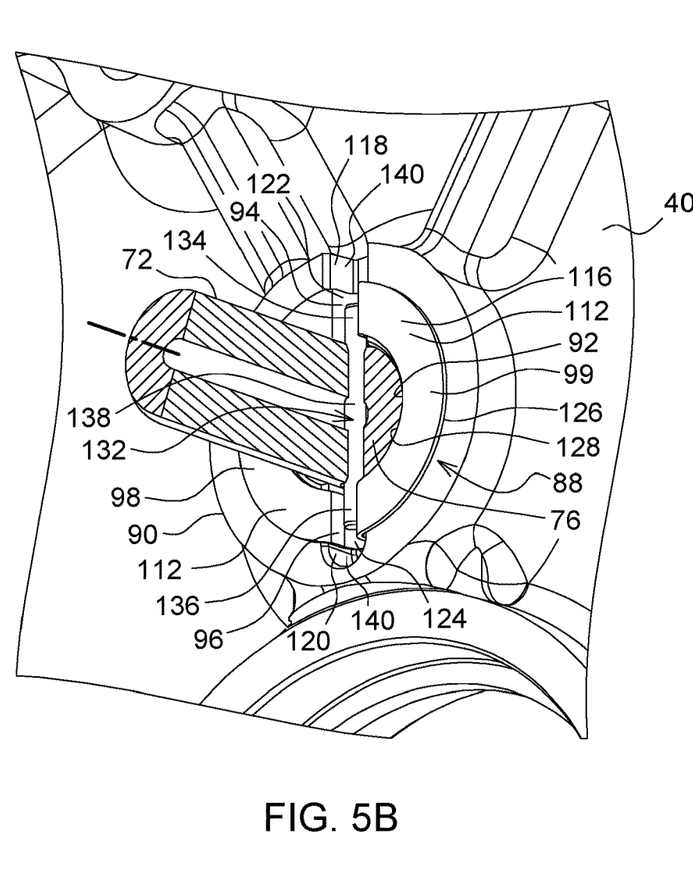
FIG. 5B is a perspective view, with portions broken away, showing a second of the pins extending through the axle and having opposite end portion disposed in respective bights of a second of the thrust washers received in respective grooves.
Figure 6:
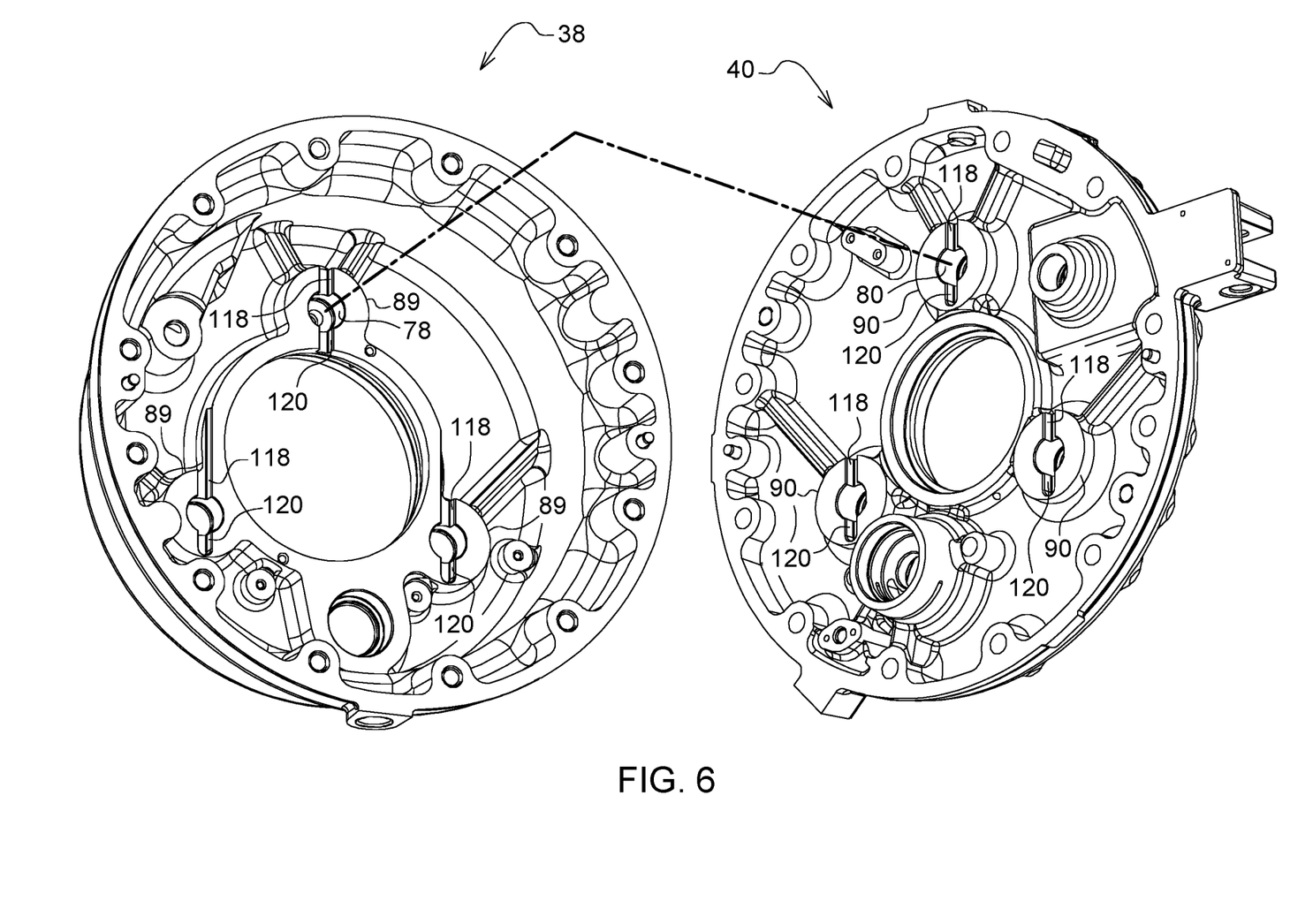
FIG. 6 is a perspective view showing first and second housing portions of a support of the gear assembly.

The planet gear assembly 70 includes a first pin 130 and a second pin 132, each of which blocks rotation of the axle 72 about the axis of rotation 64. The first pin 130 is disposed in the first and second channels 122, 124 of the first and second bights 94, 96 of the first thrust washer 86 such that the first pin 130 is disposed in the first and second bights 94, 96 of the first thrust washer 86. The second pin 132 is disposed in the first and second channels 122, 124 of the first and second bights 94, 96 of the second thrust washer 88 such that the second pin 132 is disposed in the first and second bights 94, 96 of the second thrust washer 88. The pins 130, 132 thus disposed in the channels 122, 124 of the bights 94, 96 of the respective thrust washers 86, 88 block rotation of the axle 72 about the axis of rotation 64.

Each pin 130, 132 extends into the axle 72. The first and second pins 130, 132 extend transversely through the first and second end portions 74, 76 of the axle 70, respectively. Illustratively, The first and second pins 130, 132 extend diametrically through the first and second end portions 74, 76 of the axle 70, respectively, relative to the axis of rotation 64.

Each pin 130, 132 is configured, for example, as a dowel pin. The pin 130, 132 includes a first end portion 134 disposed outside the axle 72 and in the first channel 122 of the first bight 94 of the respective thrust washer 86, 88, a second end portion 136 disposed outside the axle 72 and in the second channel 124 of the second bight 96 of the respective thrust washer 86, 88, and an intermediate portion 138 disposed between the first end portion 134 and the second end portion 136 and in the respective end portion 74, 76 of the axle 72. The thrust washers 86, 88 with the pins 130, 132 disposed in the bights 94, 96 foster a relatively compact design of the planet gear assembly 70.

Figure 7:
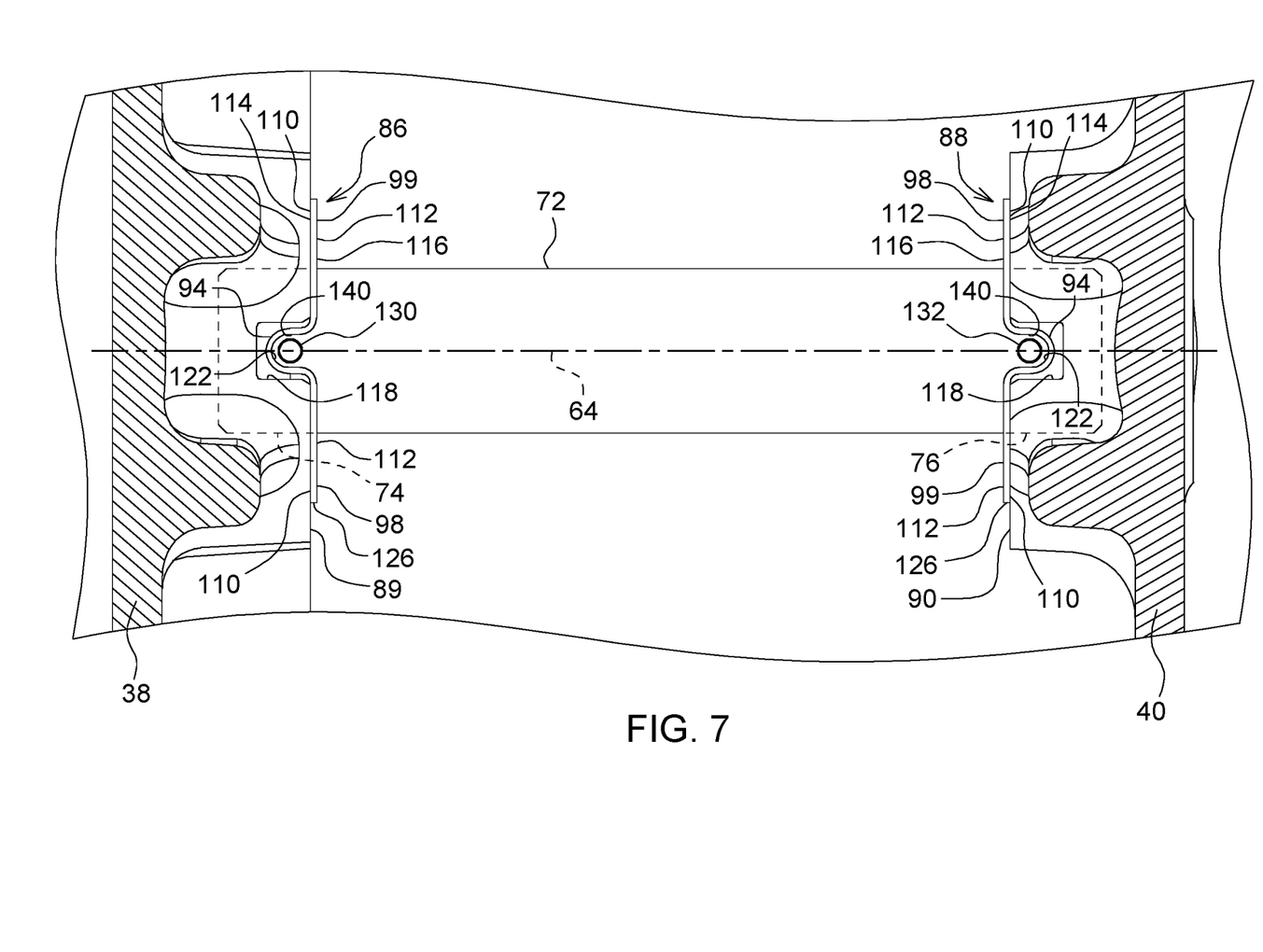
FIG. 7 is a sectional view taken along lines 7-7 of FIG. 2, with portions broken away.
Figure 8A:
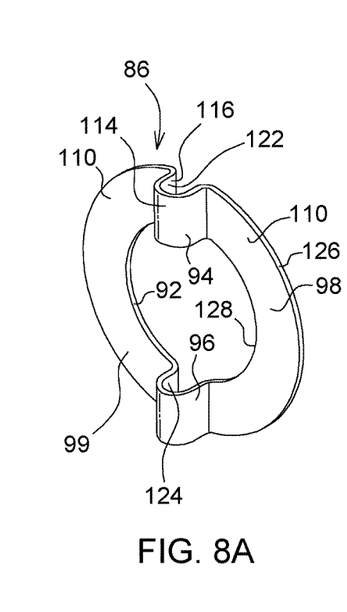
FIG. 8A is a perspective view showing the first thrust washer, the second thrust washer being like the first thrust washer in structure.
Figures 8B, 8C:
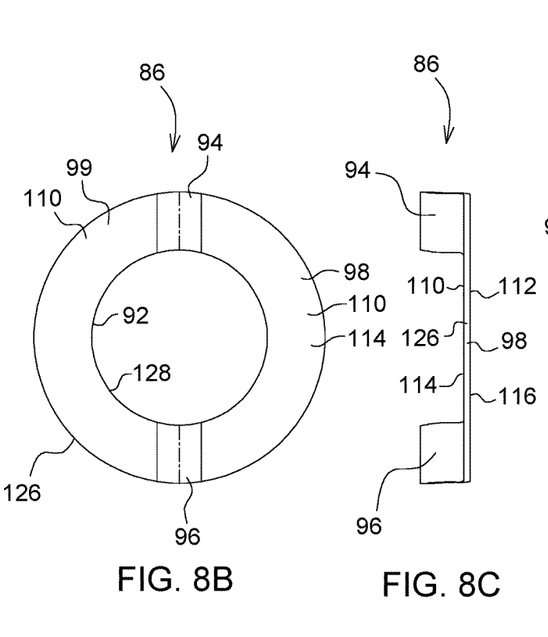
FIG. 8B is a rear elevation view showing the first thrust washer.
FIG. 8C is a side elevation view showing the first thrust washer.
Figure 8D:
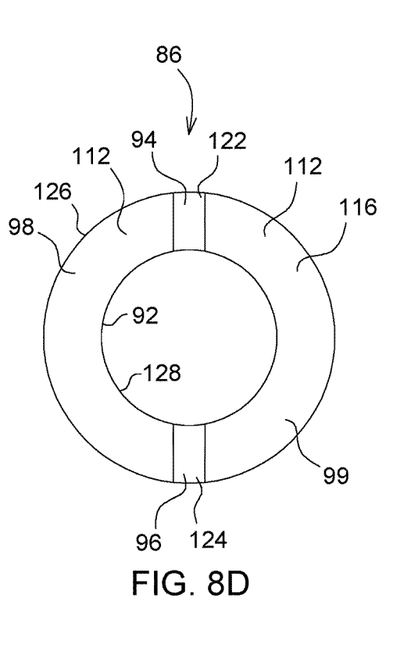
FIG. 8D is a front elevation view showing the first thrust washer.

The channels 122, 124 of each thrust washer 86, 88 are disposed in lubricant communication with the respective adjacent bearing 82. Each channel 122, 124 and the groove 118, 120 in which the channel 122, 124 is disposed cooperate to provide a lubricant passageway 140 for communication of lubricant (e.g., oil) from the interior region 63 to the respective adjacent bearing 82. The channels 122, 124 of the bights 94, 96 and the grooves 118, 120 allow lubricant to reach the bearings 82. The housing portions 38, 40 may be formed to include features that help guide lubricant to the passageways 140.

In some embodiments, each thrust washer 86, 88 may be sufficiently thick (axially) that the channels 122, 124 are provided by grooves in the second axial side 116 of the thrust washer 86, 88. In such a case, the thrust washer 86, 88 may be formed without the bights 94, 96, and may include a tab, tang, or other feature for engagement with the respective housing portion 38, 40 modified as appropriate.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A gear assembly, comprising:
   a support,
   an axle mounted to the support and defining an axis of rotation,
   a gear mounted to the axle for rotation relative to the axle about the axis of rotation,
   a pin, and
   a thrust washer disposed axially adjacent to the gear and blocked against rotation relative to the support about the axis of rotation, the thrust washer comprising a through-hole and a channel, the axle disposed in the through-hole, the pin disposed in the channel and extending into the axle, wherein the thrust washer comprises a bight projecting axially into the support and comprising the channel.

2. The gear assembly of claim 1, wherein an axial side of the thrust washer comprises the channel.

3. The gear assembly of claim 1, wherein the channel extends from a radially outer periphery of the thrust washer to a radially inner periphery of the thrust washer.

4. The gear assembly of claim 1, wherein the thrust washer comprises a second channel, and the pin is disposed in the second channel.

5. The gear assembly of claim 4, wherein the channel is a first channel, and an axial side of the thrust washer comprises the first channel and the second channel.

6. The gear assembly of claim 1, wherein the support comprises a groove into which the bight projects axially.

7. The gear assembly of claim 1, wherein the bight is a first bight, the channel is a first channel, the thrust washer comprises a second bight projecting axially into the support and comprising a second channel, and the pin is disposed in the second channel.

8. The gear assembly of claim 7, wherein the first and second bights are diametrically aligned with one another.

9. The gear assembly of claim 7, wherein the thrust washer comprises a ring formed to include the first bight, the second bight, a first arcuate portion connecting the first and second bights, and a second arcuate portion opposite to and co-planar with the first arcuate portion and connecting the first and second bights.

10. The gear assembly of claim 7, wherein the support comprises a first groove and a second groove, and the first and second bights project axially respectively into, so as to be disposed respectively in, the first and second grooves.

11. The gear assembly of claim 7, wherein the pin is configured as a dowel pin comprising a first end portion disposed outside the axle and in the first channel of the first bight, a second end portion disposed outside the axle and in the second channel of the second bight, and an intermediate portion disposed between the first end portion and the second end portion and in the axle.

12. The gear assembly of claim 1, comprising a bearing disposed radially between the axle and the gear, wherein the channel is disposed in lubricant communication with the bearing.

13. A gear assembly, comprising:
an axle defining an axis of rotation,
a gear mounted to the axle for rotation relative to the axle about the axis of rotation,
a pin, a groove, and
a thrust washer disposed axially adjacent to the gear, the thrust washer comprising a bight, the pin disposed in the bight and extending into the axle, wherein the bight projects axially into the groove.

14. The gear assembly of claim 13, wherein the bight is a first bight, the thrust washer comprises a second bight, and the pin is disposed in the second bight.

15. The gear assembly of claim 14, wherein the thrust washer comprises a ring formed to include the first bight and the second bight.

16. The gear assembly of claim 14, comprising a second groove, wherein the second bight projects axially respectively into the second groove.

17. The gear assembly of claim 13, comprising a housing in which the gear is disposed, a second dowel pin, and a second thrust washer, wherein the pin is configured as a first dowel pin, the thrust washer is a first thrust washer, the bight is a first bight, the groove is a radial first groove,
the first thrust washer is disposed axially between the gear and a first housing portion of the housing, the second thrust washer is disposed axially between the gear and a second housing portion of the housing,
the first housing portion comprises an axial first bore, the radial first groove, and a radial second groove diametrically aligned with the first groove, the second housing portion comprises an axial second bore, a radial first groove, and a radial second groove diametrically aligned with the first groove of the second housing portion,
the axle comprises a first end portion disposed in the first bore and a second end portion disposed in the second bore,
the first thrust washer comprises a second bight diametrically aligned with the first bight of the first thrust washer,
the second thrust washer comprises a first bight and a second bight diametrically aligned with the first bight of the second thrust washer,
with respect to the first thrust washer, the first and second bights project axially respectively into, so as to be disposed respectively in, the first and second grooves of the first housing portion,
with respect to the second thrust washer, the first and second bights project axially respectively into, so as to be disposed respectively in, the first and second grooves of the second housing portion,
the first dowel pin is disposed in the first and second bights of the first thrust washer and extends transversely through the first end portion of the axle, and
the second dowel pin is disposed in the first and second bights of the second thrust washer and extends transversely through the second end portion of the axle.

* * * * *